(12) United States Patent
Perez et al.

(10) Patent No.: US 12,357,939 B2
(45) Date of Patent: Jul. 15, 2025

(54) METHOD FOR REGULATING A UNIT FOR SEPARATING A GAS STREAM

(71) Applicant: L'Air Liquide, Société Anonyme pour l'Etude et l'Exploitation des Procédés Georges Claude, Paris (FR)

(72) Inventors: Maxime Perez, Bussiares (FR); Guillaume Rodrigues, La Queue en Brie (FR); Christian Monereau, Montpellier (FR); Stéphane Pusiol, Athis Mons (FR); Pierre Petit, Verrieres le Buisson (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 429 days.

(21) Appl. No.: 17/992,683

(22) Filed: Nov. 22, 2022

(65) Prior Publication Data

US 2023/0158444 A1 May 25, 2023

(30) Foreign Application Priority Data

Nov. 22, 2021 (FR) ...................................... 2112320

(51) Int. Cl.
 B01D 53/047 (2006.01)

(52) U.S. Cl.
 CPC .. B01D 53/047 (2013.01); *B01D 2259/40015* (2013.01); *B01D 2259/40016* (2013.01);
 (Continued)

(58) Field of Classification Search
 CPC ........ B01D 53/047; B01D 2259/40015; B01D 2259/40016; B01D 2259/40022; B01D 2259/40032; B01D 2259/40033; B01D 2259/40067; B01D 2259/40071; B01D 2259/40079; B01D 2259/40081;
 (Continued)

(56) References Cited

U.S. PATENT DOCUMENTS

| 5,042,994 A | * | 8/1991 | Smolarek ............. B01D 53/047 96/115 |
| 5,529,611 A | | 6/1996 | Monereau et al. |

(Continued)

FOREIGN PATENT DOCUMENTS

| EP | 0 988 883 | 3/2000 |
| FR | 2 721 531 | 12/1995 |

(Continued)

OTHER PUBLICATIONS

French Search Report for corresponding FR 2112320, May 27, 2022.

*Primary Examiner* — Frank M Lawrence, Jr.
(74) *Attorney, Agent, or Firm* — Elwood L. Haynes

(57) ABSTRACT

The invention relates to a method for regulating a unit for separating a gas stream, having P adsorbers, where $P \geq 2$, each following a PSA-type adsorption cycle with a phase time shift, the method involving the steps of operating the unit according to the nominal cycle when the required flow rate is equal to a nominal flow rate or optionally when the required flow rate is higher than the nominal flow rate, and operating the unit according to the reduced cycle when the required flow rate is lower than or equal to a predetermined flow rate, the predetermined flow rate being lower than the nominal flow rate.

10 Claims, 1 Drawing Sheet

(52) U.S. Cl.
CPC .............. *B01D 2259/40022* (2013.01); *B01D 2259/40032* (2013.01); *B01D 2259/40033* (2013.01); *B01D 2259/40067* (2013.01); *B01D 2259/40071* (2013.01); *B01D 2259/40079* (2013.01); *B01D 2259/40081* (2013.01)

(58) Field of Classification Search
CPC ........... B01D 2259/40007; B01D 2259/40045; B01D 2259/40047; B01D 2259/40075; B01D 53/0476; B01D 2259/40011; Y02C 20/40
USPC .......................... 95/96–98, 103; 96/115, 121
See application file for complete search history.

(56) References Cited

U.S. PATENT DOCUMENTS

| | | | |
|---|---|---|---|
| 5,876,485 A | | 3/1999 | Andreani |
| 5,989,313 A | * | 11/1999 | Mize .................... F25J 3/04169 |
| | | | 95/96 |
| 6,090,185 A | | 7/2000 | Monereau et al. |
| 6,238,458 B1 | | 5/2001 | Monereau |
| RE38,493 E | * | 4/2004 | Keefer ............... B01D 53/0446 |
| | | | 96/144 |
| 2003/0097930 A1 | | 5/2003 | Kleinberg et al. |
| 2016/0250580 A1 | | 9/2016 | Monereau et al. |
| 2021/0039039 A1 | * | 2/2021 | Rodrigues .......... B01D 53/0476 |
| 2022/0258094 A1 | * | 8/2022 | Rosinski ............ B01D 53/0446 |

FOREIGN PATENT DOCUMENTS

| | | |
|---|---|---|
| FR | 2 751 892 | 2/1998 |
| FR | 2 772 637 | 6/1999 |
| FR | 3 011 481 | 4/2015 |

* cited by examiner

METHOD FOR REGULATING A UNIT FOR SEPARATING A GAS STREAM

CROSS REFERENCE TO RELATED APPLICATIONS

This application claims the benefit of priority under 35 U.S.C. § 119 (a) and (b) to French Patent Application No. 2112320, filed Nov. 22, 2021, the entire contents of which are incorporated herein by reference.

BACKGROUND

The present invention relates to a method for regulating a unit for separating a gas stream, the unit being of the PSA (or "pressure swing adsorption") type and more particularly of the VPSA type, that is to say implementing vacuum pumping means. It may apply as soon as the required production flow rate is lower than the nominal flow rate which was used for its dimensioning.

In PSA processes, the adsorbent, at the end of the production phase, is regenerated by desorption of the impurities, this being achieved by means of a drop in their partial pressure. This drop in pressure can be obtained by a drop in the total pressure and/or by flushing with a gas devoid of or containing little in the way of impurities.

Pressure swing adsorption processes are used both to eliminate traces of impurities for example, in levels below one percent in the feed gas—and to separate mixtures containing several tens of percent of different gases. The first case is generally referred to as purification (gas drying, for example) and the second case as separation (producing oxygen or nitrogen from atmospheric air, for example).

In general, a gas phase adsorption process makes it possible to separate one or more molecules from a gas mixture containing said molecules, by utilizing the difference in affinity of one or more adsorbents for the various constituent molecules of the mixture. The affinity of an adsorbent for a molecule depends partly on the structure and composition of the adsorbent and partly on the properties of the molecule, particularly its size, electron structure and multipole moments. An adsorbent can be, for example, a zeolite, an activated carbon, an optionally doped activated alumina, a silica gel, a carbon molecular sieve, an organo-metallic structure, an alkaline or alkaline-earth metal oxide or hydroxide, or a porous structure containing preferably a substance capable of reacting reversibly with the molecules, a substance such as amines, physical solvents, metal complexing agents, metal oxides or metal hydroxides, for example.

The most conventional adsorbent materials are in the form of particles (beads, rods, crushed materials, etc.), but also exist in a structured form, such as monoliths, wheels, parallel passage contactors, fabrics, fibres, etc.

There are 3 main families of adsorption processes: sacrificial charge processes, processes referred to as TSA (temperature swing adsorption) processes and lastly PSA (pressure swing adsorption) processes.

In sacrificial-charge processes, a new charge is introduced when the existing charge is saturated with the impurities, or more generally when it is no longer able to provide adequate protection.

In TSA processes, the adsorbent, at the end of use, is regenerated in situ, meaning that the impurities captured are discharged in order that said adsorbent recovers the greater part of its adsorption capabilities and can restart a purification cycle, the main regeneration effect being due to an increase in temperature.

Lastly, in PSA processes, the adsorbent, at the end of the production phase, is regenerated by desorption of the impurities, this being achieved by means of a drop in their partial pressure. This drop in pressure can be obtained by a drop in the total pressure and/or by flushing with a gas devoid of or containing little in the way of impurities.

Pressure swing adsorption processes are used both to eliminate traces of impurities—for example, in levels below one percent in the feed gas—and to separate mixtures containing several tens of percent of different gases. The first case is generally referred to as purification (gas drying, for example) and the second case as separation (producing oxygen or nitrogen from atmospheric air, for example).

In the context of the present invention, the term PSA denotes any process for the purification or separation of gas employing a cyclical variation in the pressure which the adsorbent experiences between a high pressure, referred to as adsorption pressure, and a low pressure, referred to as regeneration pressure. Thus, this generic designation of PSA is employed without distinction to denote the following cyclical processes, to which it is also commonplace to give more specific names, depending on the pressure levels employed or the time necessary for an adsorber to return to its starting point (cycle time):

- VSA processes, in which the adsorption is carried out substantially at atmospheric pressure, preferably between 0.95 and 1.25 bar abs, and the desorption pressure is lower than atmospheric pressure, typically from 50 to 400 mbar abs;
- MPSA or VPSA processes, in which the adsorption is carried out at a high pressure greater than atmospheric pressure, typically between 1.5 and 6 bar abs, and the desorption is carried out at a low pressure lower than atmospheric pressure, generally between 200 and 600 mbar abs;
- PSA processes proper, in which the high pressure is substantially greater than atmospheric pressure, typically between 3 and 50 bar abs, and the low pressure is substantially equal to or greater than atmospheric pressure, generally between 1 and 9 bar abs;
- RPSA (Rapid PSA) processes, for which the duration of the pressure cycle is typically less than a minute;
- URPSA (Ultra Rapid PSA) processes, for which the duration of the pressure cycle is of the order of a maximum of a few seconds.

It should be noted that these various designations are not standardized and that the limits are subject to variation.

Once again, unless otherwise stated, the use of the term PSA here covers all of these variants, "PSA" then being taken with the most general meaning. However, in certain cases, it may be necessary to specify more particularly whether the process is a VSA or a VPSA, and in particular if it is matter of pumping under vacuum.

An adsorber will thus begin a period of adsorption at the high pressure until it is loaded with the constituent or constituents to be captured and will then be regenerated by depressurization and extraction of the adsorbed compounds, before being restored in order to again begin a new adsorption period. The adsorber has then completed a pressure cycle and the very principle of the PSA process is to link these cycles together one after the other; it is thus a cyclical process. The time that an adsorber takes to return to its initial state is referred to as the cycle time. In principle, each adsorber follows the same cycle with a time shift, which is known as phase time or more simply phase. Hence the relationship; phase time=cycle time/number of adsorbers. It is apparent that the number of phases is equal to the number of adsorbers.

This cycle generally comprises periods of:
Production or Adsorption, during which the feed gas is introduced via one of the ends of the adsorber, the most adsorbable compounds are adsorbed preferentially and the gas enriched in the least adsorbable compounds (product gas) is extracted via the second end. The adsorption can be carried out at an increasing pressure, at a substantially constant pressure or even at a slightly decreasing pressure;
Depressurization, during which a portion of the compounds present in the adsorbent and in the free spaces is discharged from the adsorber, which is no longer fed with feed gas, via at least one of its ends. Taking as reference the direction of circulation of the fluid in the adsorption period, it is possible to define co-current, counter-current or simultaneously co-current and counter-current depressurizations.
Elution or Purge, during which a gas enriched with the least adsorbable constituents (purge gas) circulates through the adsorbent bed in order to help in the desorption of the most adsorbable compounds. Purging is generally performed counter-currently;
Repressurization, during which the adsorber is at least partially repressurized before again starting an Adsorption period, Repressurization can take place counter-currently and/or co-currently;
Dead time, during which the adsorber remains in the same state. These dead times can form an integral part of the cycle, as an entire separate step, making it possible for example to synchronize steps between adsorbers, or only correspond to the end of a step which has finished before the allotted time (in this case, the expression waiting period is also used). The valves can be closed or remain in the same state, depending on the characteristics of the cycle.

It will be recalled that the term "co-current" refers to a stream that runs in the same direction as the feed gas when it passes through the adsorber and that the term "counter-current" refers to a stream that runs in the opposite direction.

It will be recalled that a phase may comprise several separate steps and, conversely, that a step may proceed over more than one phase (it is then possible to say that the step is made up of several sub-steps belonging to successive phases).

It will also be recalled that a step is characterized by the streams entering and/or exiting the adsorber, their origins and their destinations. Thus, the depressurization of an adsorber with successive periods corresponding to a first equalization (the gas repressurizing a first adsorber), to a second equalization (the gas repressurizing a second adsorber) and to the production of elution gas, involves 3 separate steps, although it is a matter of co-current depressurization in all 3 cases.

Similarly, for example, an elution period during which the low-pressure adsorber is flushed with a gas coming successively from two different steps itself involves two separate steps.

In general, a unit for separating gases by adsorption using a PSA process is designed according to specifications relating in particular to the production flow rate to be ensured (nominal flow rate or 100% flow rate) and the associated required purity.

A problem that arises is that of envisaging a solution for ensuring the best possible operation once the production flow rate effectively required is lower than the nominal flow rate. This is the case for example when a margin was allowed during the design of the unit or when demand is reduced per period for reasons inherent to the site at which the PSA unit has been installed (maintenance, different kinds of operation of downstream units, reduced consumption, etc.).

Each PSA process may have its own solution, but very often the principle adopted consists both in reducing the flow rate of feed gas and of extending the phase time and hence the cycle time. It is thus possible to ensure that the adsorbent conveys the same quantity of gas in reduced operation (meaning in the reduced cycle) as in nominal operation (meaning in the nominal cycle) and thus maintains the same performance aspects.

The extension of the phase time is effected by increasing the duration of at least one of the constituent steps of each phase. This is a particularly simple method that is used very widely in H2 PSAs and well document in the literature. On the basis of the measurement of the required flow rate, the device for controlling the most recent H2 PSAs automatically manages the reduced operations and makes it possible to maintain the hydrogen extraction yield of the unit over a very wide range of flow rates.

When there are machines associated with the unit (compressor, vacuum pump), there should be a means for limiting the quantities of gas introduced or withdrawn for durations that are longer a priori on account of the new cycle implemented.

At least two means may be used to this end. The most upscale one consists in using variable speed machines. All that is necessary is to adapt the speed to the new step duration. This solution has two drawbacks: higher investment, increased energy consumption in normal operation on account of the efficiency of the speed variator to be incorporated in the balance.

It is also possible to introduce a "bypass" time during which the machine "rotates on itself" without sending a gas stream towards the adsorbers and/or without drawing in a stream from an adsorber, specifically with minimum energy consumption. This solution is commonly used in units of the VSA or VPSA type. Reference may be made to EP 988 883 for example.

Other solutions have been described, in which the pressures of the cycle are varied (see for example EP 689 862 and EP 923 977) and which, as a result, are not able to be used systematically.

Note that, in particular when the unit incorporates machines, the basic solution in reduced operation is to add dead times during which the adsorbers are isolated and during which the machines rotate on their "bypass" or draw in and/or deliver for example at atmospheric pressure.

Although this solution has been satisfactory for a very long time, it reaches its limits with the current tendency to accelerate the cycles in order to reduce the volume of adsorbent necessary to effect the separation. This is because the addition of a dead time to isolate an adsorber for a certain time means that the valves need to be closed and opened. However, it is these operations for closing the valves leaktightly and then opening them again that wear the most sensitive parts of the valve fittings, in particular the seals and generally the wearing components, whereas simple movements associated with the regulation of a setpoint are, for their part, without notable effect.

Proceeding from these observations, a problem that arises is that of allowing the adjustment of the production of a unit for separating gas by adsorption of the PSA type which, in reduced operation, does not require the opening and closing, phase after phase, of a valve in order to introduce dead times for isolating the adsorbers.

SUMMARY

The present invention aims to effectively overcome these drawbacks by providing a method for regulating a unit for separating a gas stream, having P adsorbers, where $P \geq 2$, each following a PSA-type adsorption cycle with a phase time shift, the unit having a control device allowing the unit to provide a required flow rate and to operate selectively according to a nominal cycle or according to a reduced cycle, the nominal cycle involving, successively, at least a first step and a second step, the reduced cycle following the same succession of steps as the nominal cycle, with insertion of an intermediate step between the first step and the second step, the intermediate step being different from a dead time and being different from an extension of the first step or an extension of the second step, the method involving the steps of:

operating the unit according to the nominal cycle when the required flow rate is equal to a nominal flow rate or optionally when the required flow rate is higher than the nominal flow rate, operating the unit according to the reduced cycle when the required flow rate is lower than or equal to a predetermined flow rate, the predetermined flow rate being lower than the nominal flow rate.

This makes it possible to adjust the production on demand (meaning the required flow rate) particularly effectively. Specifically, extending the reduced cycle makes it possible, as the case may be, to improve the extraction yield or the specific production energy compared with a simple reduction in the production flow rate.

According to one embodiment, the predetermined flow rate is defined by the relationship $Drm = Dn \times (Tphn/(Tphn + tjm))$, Drm being the predetermined flow rate, Dn being the nominal flow rate, Tphn being the phase time of the nominal cycle for the nominal production flow rate, and tjm the minimum duration of the intermediate step.

According to one embodiment, the predetermined flow rate is between 88% and 98% of the nominal flow rate and preferably between 90% and 95% of the nominal flow rate.

According to one embodiment, if the required flow rate is lower than or equal to the predetermined flow rate, the duration of the intermediate step tj is calculated using the formula $tj = Tphn \times (Dn/Dr - 1)$, Dr being the required flow rate, and this intermediate step is added systematically, by turns, to the P adsorbers of the unit.

According to one embodiment, if the required flow rate is higher than the predetermined flow rate, the minimum duration of the intermediate step is only added during a complete cycle, by turns, to the P adsorbers of the unit, every X cycles, X being the first whole number greater than or equal to (Dn−Drm) (Dn−Dr), Dr being the required flow rate.

According to one embodiment, each of the phase times corresponding to the nominal cycle is extended in the reduced cycle by an additional duration, each additional duration coming, respectively, depending on the phase of the cycle in which the adsorbers are located, from the intermediate step for a first adsorber, and either from another intermediate step or from an extension of a step of the nominal cycle, or from a dead time, for the other adsorbers.

According to one embodiment, the method comprises the step of:

operating the unit periodically, according to the nominal cycle and according to the reduced cycle, when the required flow rate is between the predetermined flow rate and the nominal flow rate, or operating the unit according to the nominal cycle while producing a flow rate lower than the nominal flow rate, when the required flow rate is between the predetermined flow rate and the nominal flow rate.

According to one embodiment, the intermediate step and the first step each involve co-current depressurization or they each involve counter-current depressurization.

This makes it possible to limit the operations of opening and closing the valves in order to limit the maintenance thereof. Specifically, the same valve could be used to regulate the two depressurization streams with only an adjustment of the opening percentage if necessary.

According to one variant, the intermediate step and the second step each involve co-current depressurization or they each involve counter-current depressurization.

This makes it possible to limit the operations of opening and closing the valves in order to limit the maintenance thereof in the same way as above.

According to another variant, the intermediate step, the first step and the second step each involve co-current depressurization or they each involve counter-current depressurization.

This makes it possible to limit the operations of opening and closing the valves in order to limit the maintenance thereof.

According to another variant, the intermediate step and the first step are steps either of elution or of repressurization, each involving a counter-current intake of gas.

According to another variant, the intermediate step and the second step are steps either of elution or of repressurization, each involving a counter-current intake of gas.

According to another variant, the intermediate step, the first step and the second step are steps either of elution or of repressurization, each involving a counter-current intake of gas.

According to one embodiment, the minimum duration of the intermediate step is between 0.5 and 3 s.

According to one embodiment, the phase time of the unit is between 5 s and 40 s, preferably between 10 s and 20 S.

According to one embodiment, the method is implemented by the control device on the basis of information provided by sensors of the unit, in particular sensors measuring pressure, flow rates, composition or purity and predetermined data loaded in the control device, in particular phase time of the nominal cycle for the nominal production flow rate, the minimum duration of the intermediate step, the nominal flow rate.

According to one embodiment, the required flow rate of the unit is a measured flow rate or a setpoint or is determined from the measurement of other parameters such as the pressure in a pipe or the variation in pressure of a volume.

According to one embodiment, the method is implemented only if the production purity is greater than a predetermined purity value.

The invention also relates to a unit for separating a gas stream, having P adsorbers, where $P \geq 2$, each following a PSA-type adsorption cycle with a phase time shift, the unit having a control device allowing the unit to provide a required flow rate and to operate selectively according to a nominal cycle or according to a reduced cycle, the control device being designed to implement the method as described above.

According to one embodiment, the unit has at least one vacuum pump.

According to one embodiment, the unit has 2 adsorbers.

According to one embodiment, the unit implements a pressure cycle comprising two phase times, one phase time being extended in the reduced cycle, of the intermediate step, and the other phase time, of the corresponding step, having the same duration, and consisting in receiving the gas from the intermediate step.

According to one embodiment, the unit has the equipment necessary for implementing the pressure cycle followed by each of the adsorbers, in particular at least one set of pipes, at least one set of valve fittings, at least one instrumentation means.

According to one embodiment, the unit is intended to produce a stream enriched with oxygen from atmospheric air, the oxygen content of the production being preferably between 88 and 94 mol %, in particular between 90 and 93 mol %.

According to one embodiment, the unit is designed to produce at least one gas enriched with CO2 and at least one gas depleted in CO2 from a feed mixture containing CO2.

BRIEF DESCRIPTION OF THE FIGURES

The invention will be understood better from reading the following description and from studying the accompanying figures. These figures are given only by way of illustration and do not in any way limit the invention.

DETAILED DESCRIPTION OF PREFERRED EMBODIMENTS

Figure 1:
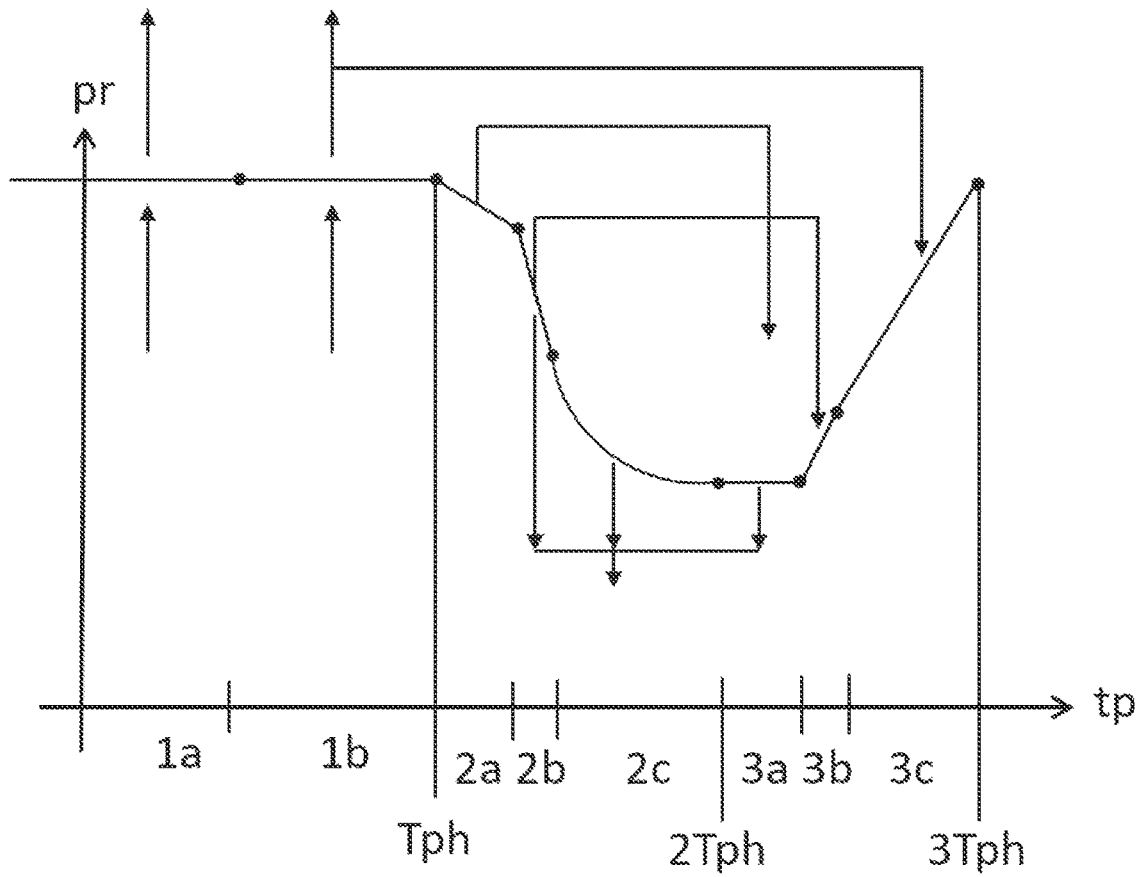
FIG. 1 is a schematic depiction of a nominal cycle of a PSA according to the invention.

In general, the nominal flow rate is the flow rate taken into account during the dimensioning of the unit. It is generally the flow rate specified by the end user. The expression "100% flow rate" is also used, and it is not always possible to go beyond this. However, this may effectively be undertaken, for example by sacrificing the purity of the production somewhat.

The cycle corresponding to the nominal flow rate is the nominal cycle. It is this that makes it possible to produce 100%. The phase time of the nominal cycle is referred to as "Tphn".

The required flow rate is the flow rate that the unit needs to produce at a given time in order to meet the user's demand. The required flow rate is lower than or equal to the nominal flow rate, since otherwise, this will mean that the user has misjudged their need.

In order to make a step of the cycle (even a dead time) operational, it is necessary for there to be a predetermined minimum duration. This predetermined minimum duration is referred to as "tjm". It is often around 1 to 2 seconds. This duration is necessary in order to operate a valve, to establish a flow rate.

A reduced cycle is understood to be any cycle involving a modification compared with the nominal cycle (duration of steps, addition of steps) so as to adapt the unit to a required flow rate different from the nominal flow rate.

When the required flow rate is lower than the nominal flow rate, a known solution is to increase the production time so that the product of the flow rate produced multiplied by the production duration remains constant. This means that the volume of adsorbent always treats the same quantity of gas.

It has become apparent that, in a certain number of PSA cycles, it was possible to extend the phase time by adding to the nominal cycle, at certain points, an additional step (or intermediate step), different from the preceding step and from the following step, which therefore did not correspond to simple extension of a pre-existing step or to a dead time since it involves a stream transfer.

Thus, a method for regulating a unit for separating a gas stream, having P adsorbers, where P≥2, each following a PSA- or VPSA-type adsorption cycle with a phase time shift, is defined.

The unit has a control device allowing the unit to provide a required flow rate and to operate selectively according to a nominal cycle or according to a reduced cycle.

The nominal cycle successively has at least a first step and a second step. The reduced cycle follows the same succession of steps as the nominal cycle, with insertion of an intermediate step between the first step and the second step.

The intermediate step differs from a dead time and differs from an extension of the first step or from an extension of the second step.

The method according to the invention is implemented by the control unit. The method involves the steps of:
  operating the unit according to the nominal cycle when the required flow rate is equal to a nominal flow rate or optionally when the required flow rate is higher than the nominal flow rate,
  operating the unit according to the reduced cycle when the required flow rate is lower than or equal to a predetermined flow rate, the predetermined flow rate being lower than the nominal flow rate.

The advantage of incorporating such an intermediate step into the nominal cycle makes it possible to avoid repetitive movements of valves that are detrimental to the proper operation thereof and to easily carry out reduced operations which would be tricky to implement without ft.

In the example in FIG. 1, such a nominal cycle of a PSA, more particularly a VSA cycle, or a unit having 3 adsorbers and therefore 3 separate phase is illustrated. The diagram in FIG. 1 shows the pressure Pr as a function of time tp.

The first production phase has 2 steps: 1a, 1b. During step 1a, the adsorber is fed by the feed gas in its bottom part and supplies the production gas at its top part, whereas, during step 1b, it also supplies the repressurization gas of the 3rd adsorber. The phase time is 20 seconds and each of steps 1a, 1b lasts 10 seconds.

The second phase of the cycle comprises 3 steps:
  a step 2a, with a duration of 5 seconds, which is co-current depressurization supplying the elution gas to the 3rd adsorber, which is then at the low pressure of the cycle, for example around 0.3 bar abs, obtained by vacuum pumping;
  a step 2b, with a duration of 5 seconds, which is simultaneous counter-current depressurization by vacuum pumping and co-current depressurization for supplying repressurization gas to the 3rd adsorber;
  a step 2c, which is vacuum pumping down to the low pressure of the cycle for a duration of 10 seconds.

The third adsorber will successively follow:
  the step 3a, which is an elution step with a duration of 5 seconds;

the step 3b, which is a first repressurization with a duration of 5 seconds;

the step 3c, which is a final repressurization with a duration of 10 seconds.

As in any PSA cycle, the duration of each phase is found to be identical, in this case 20 seconds, and the steps involving direct exchanges of streams between two adsorbers are found to correspond temporally, meaning that the start at the same moment in their respective phases, and to have the same duration, for example the supply of elution gas 2a lasts 5 seconds and lies at the start of the phase, just like the elution step 3a proper, which receives this gas and also lies at the start of the phase and lasts 5 s.

Since the PSA cycle is the cycle provided during dimensioning or the actual cycle implemented on starting, the flow rate produced under these conditions with the specified purity is referred to here as the nominal flow rate. If everything were exactly as calculated, this flow rate would correspond to the dimensioning flow rate. In practice, it may be somewhat higher if, for example, the quality of the adsorbent is better than anticipated or if the vacuum pump, in the case of a VSA, is somewhat more effective.

It will be noted that, with our definition, the nominal flow rate may change during operation, for example downwardly if the adsorbent is contaminated. Thus, the nominal flow rate used to determine better reduced operation may, as the case may be, correspond to the reference 100 of the calculation, 106 measured on starting or 95 after a year of operation. This type of measurement is normally taken periodically by the operator after having brought the other parameters into line with the dimensioning data, since this is the safest way of determining the state of the unit and monitoring its change over time.

It is assumed below that only around 90% of the nominal flow rate is required.

A first means, not shown here, could be to continue the same cycle by closing a production valve in order in this way to limit the flow rate produced. This generally brings about an increase in the purity of the production but is accompanies by a non-negligible increase in the specific production energy, having a detrimental effect on this solution.

It is preferable to increase the phase time by 10% by maintaining the performance aspects of the PSA per cycle time. Thus, the objective would be to treat the same quantity of feed gas, to extract the same quantity of residual gas via the vacuum pump and to produce the same quantity of purified gas per cycle of 66 seconds (3×22) rather than 60 seconds (3×20) in nominal operation. The hourly production is thus reduced by 10%.

Figure 2:
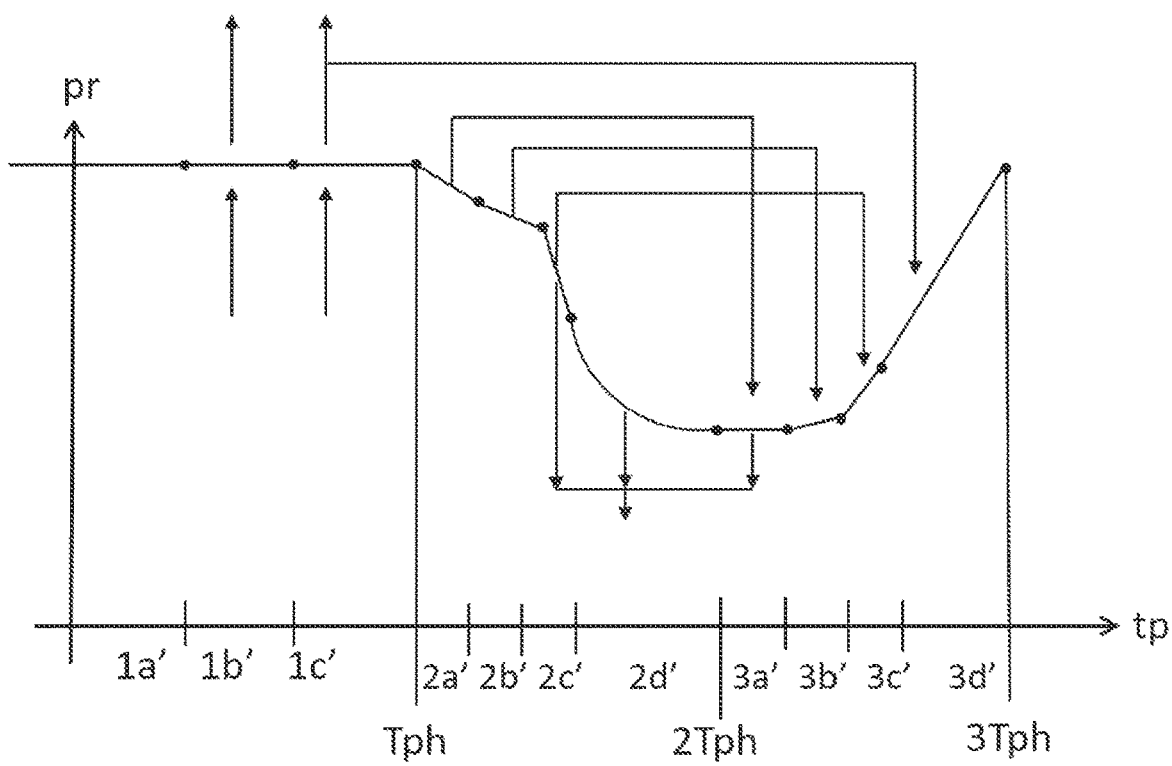
FIG. 2 is a schematic depiction of a reduced cycle of the PSA in FIG. 1.

FIG. 2 shows an example of a reduced cycle of the PSA in FIG. 1. The diagram in FIG. 2 shows the pressure Pr as a function of time tp.

As can be seen in FIG. 2, the reduced cycle is characterized by the addition to the nominal cycle of a step 2b'. In this example, this is a co-current depressurization step in which the gas serves to start to repressurize the third adsorber. It differs from the preceding step 2a' (in which the gas serves for elution) and from the following step 2c' (for which depressurization takes place simultaneously counter-currently and co-currently).

It is a new step referred to as an intermediate step.

Thus, the term "intermediate step" is used for any step introduced into the reduced cycle compared with the nominal cycle, with the features of the invention (different from a dead time and different from an extension of the first step or an extension of the second step).

This intermediate step is different from the steps on either side of it. It should be noted that, in order to realize a reduced operation of this type, it is not enough to extend a single phase but rather all of the phases of the PSA cycle should be extended by the same duration, in this case 2 seconds.

There are several ways of extending the production phase. It is possible to quite simply extend it and simultaneously decrease the feed flow rate by acting on the "bypass" of the compressor. Thus, 10% less fluid is introduced for a duration that is 10% longer, meaning that the adsorbent receives the same quantity of gas per feed phase.

In the example in FIG. 2, the decision is also taken to introduce a dead time of two seconds at the start of the production phase (step 1 a'), during which the compressor (in this case a blower) sends a non-zero flow rate to the adsorber (delivery valve closed for example). In this example, this step 1a' should not be considered to be an intermediate step.

Still in the example in FIG. 2, the third phase comprises an intermediate step 3b' of 2 seconds. This is clearly a second intermediate step according to the invention since it is different from the preceding step 3a' (elution) and the following step 3c' (in which the repressurization gas comes from an adsorber with simultaneous co-current and counter-current depressurization).

Thus, FIG. 2 illustrates a reduced cycle which is obtained by the addition of two intermediate steps to the nominal cycle. Each intermediate step is different from the preceding step and the following step and is not a dead time. Each intermediate step is in a different phase time (the 2nd and the 3rd in the example in question). In the example in FIG. 2, a dead time is furthermore added in the last phase time (the 1st phase time in the example in question). Note that this would also have been the case if only one intermediate step had been introduced.

In one variant, a single valve is used in the nominal cycle, this making it possible to control the co-current depressurization of the 2nd adsorber. The valve controls both the elution flow rate sent to the third adsorber (2a-3a) but also the recompression flow rate of this same third adsorber (2b-3b). The control device of the unit regulates the opening of the valve depending on the setpoints supplied to it (a priori intermediate pressures of the cycle).

During reduced operation (that is to say when the unit is operating according to the reduced cycle), it is the same valve which will regulate the flow rate of the first repressurization of the adsorber 3 (2b'-3b'). No opening/closing of the valve is necessary: the valve is only provided with a regulating time, this not having any effect on its operation.

As already indicated, one of the main developments in relation to PSAs is the acceleration of the cycles, meaning, in practice, the shortening of the phases. This makes it possible to produce more with the same volume of adsorbent or, with the same production, to reduce the necessary volume of adsorbent to be used. This approach often causes a little of the effectiveness of the unit to be sacrificed in terms of yield or specific energy in order to achieve a very substantial increase in productivity and therefore investment. Take the example of a cycle which has been compacted to the maximum given the kinetics of the adsorbents and the possibilities of the equipment. It comprises a phase corresponding to the repressurization of the adsorber from the low pressure to the high pressure of adsorption. There are a plurality steps for carrying out this repressurization, for example: elution at increasing pressure, counter-current repressurizations with various streams coming from other adsorbers (for example equalizations, partial equalizations), streams sometimes stored temporarily in buffer volumes, with a fraction of the production, co-current repressurizations likewise with various streams coming from other adsorbers or with the feed gas. Some of these repressurizations could be effected simultaneously co-currently and counter-currently.

A rapid PSA cycle with phases of 10 to 20 seconds will, for practical reasons, only bring about the repressurization of an adsorber with a limited number of steps, often 2 to 4 at most.

The steps adopted will be the ones that are the most effective and which are easy to incorporate into the complete cycle of the PSA.

Thus, a rapid VSA cycle used for the production of a stream enriched with oxygen involves, in nominal operation, a repressurization comprising elution at increasing pressure, counter-current equalization by a stream coming from another adsorber with, simultaneously, the co-current intake of atmospheric air followed by final repressurization with air.

It is known that the introduction of one or two complementary steps would make it possible to improve the effectiveness of the VSA cycle but would, at least with the technology used, result in the phase time being extended by around 1.5 to 3 seconds. For an initial phase time of 15 seconds, this would lead to the automatic loss of 10% to 20% of productivity for a smaller increase in effectiveness of the cycle. The economic balance is not in favour of the addition of new steps. By contrast, it will be appreciated that if this same unit operates only at less than 90% or at less than 80% of its nominal flow rate, it is possible to benefit from the resultant margin in order to introduce one or two new steps which will then improve the performance. This or these new steps will be, for example, simple counter-current repressurization with gas coming from another adsorber positioned straight after the step of elution at increasing pressure and/or counter-current repressurization with a fraction of the production before the final repressurization with the feed gas (this counter-current repressurization being able to be at least partly simultaneous with the introduction of the feed gas).

The invention therefore benefits from reduced operation to add either partial pressure equalization between adsorbers or a new recompression step. An indicative duration of 1.5 to 2 seconds has been indicated for these new steps. The introduction of a new step into the cycle will depend not only on the way in which it is inserted into the cycle (for example on the number of valves to be operated, possible stresses before these operations), on the possibilities of the control device, on the type and size of the valves. The maximum operating speeds of the valves are generally indicated by their supplier. The same goes for the response time of the control device.

When a majority of parameters are favourable, it is possible to approach 0.5 seconds for the introduction of a new step. With parameters that are less favourable, this will be more like 3 to 4 seconds.

This means that the method may only be implemented starting from a certain extension of the cycle and therefore from a certain reduced flow rate.

In a majority of PSA cycles, in the case of a required flow rate Dr that is lower than the nominal flow rate Dn, the phase time of the nominal cycle is extended for the nominal production flow rate (that is to say the duration of the nominal adsorption phase) Tphn by a duration t so as to have the relationship: Dr×(Tphn+t)=Dn×Tphn.

This means that the adsorber produces the same quantity of production gas during one cycle and therefore likewise treats, to a first approximation, the same quantity of feed gas.

This immediately results in Dr=Dn×(Tphn/(Tphn+t)), which provides the production flow rate as a function of t. There is also the relationship: t=Tphn×((Dn/Dr)−1), which provides the time t corresponding to a required flow rate Dr Note that, more generally, there would be the relationships Dr=f(t) and t=g(Dr), the functions f and g being able to be determined on the basis of a certain number of simulations or tests. The functions f and g may possibly include other parameters such as the inlet temperature of the feed gas, a pressure of the cycle or even the purity of the production.

Once the minimum duration of the intermediate step tjm has been fixed as a function of the particularities of the PSA cycle as seen above, the value of a predetermined flow rate Drm (maximum value corresponding to the flow rate produced in a reduced cycle) is determined with the relationship Drm=Dn×(Tphn/(Tphn+tjm)).

For example, for a phase time of 30 seconds and a minimum duration of the intermediate step of 1.5 seconds, the invention could be implemented systematically, that is to say successively in all the cycles, for a required flow rate less than or equal to 95.2% of the nominal flow rate.

For the same unit, the extension t of the production phase could be determined for a required flow rate less than 95.2% and hence the duration of the intermediate step tj (tj=t). For example, for a required flow rate of 88%, tj=4.1 seconds.

For required flow rates higher than 95.2% and lower than 100%, the principle employed will be to introduce a reduced flow rate cycle among the 100% cycles. For example, an average production equal to 97.6% would be obtained by successively implementing a nominal cycle and a minimum reduced cycle with an intermediate step of 1.5 s. More specifically in this case, the P adsorbers of the unit will successively implement a nominal cycle, a reduced cycle, a nominal cycle, etc. Since the duration of a cycle is short, the small variations in the production flow rate have no impact and are rapidly compensated via the downstream equipment.

More or less complex algorithms can be found to determine the optimal sequences, but if the required flow rate Dr is higher than the predetermined flow rate Drm, one solution consists in only adding the intermediate step of minimum duration tjm during a complete cycle (by turns over the P adsorbers of the unit), every X cycles where X is determined by the relationship: X=first whole number greater than or equal to (Dn−Drm)/(Dn−Dr).

For example, for: Drm=95.2% and Dn=100%, by definition, there is obtained:
  for Dr=97.6, the ratio (Dn−Drm)/(Dn−Dr)=4.8/2.4=2, and hence X=2, this representing a reduced operation every 2 cycles;
  for Dr=98, the ratio=(Dn−Drm)/(Dn−Dr)=4.8 12=2.4, and hence X=3, this representing a reduced operation every 3 cycles (or 1 cycle in 3).

In practice, production will be slightly greater than or equal to 98.4%.

Such a difference has, a priori, no effect and lies within the uncertainty of measurement of flow meters.

This may result, for example on an O2 VSA, in an increase in the purity of the oxygen of around 0.1 to 0.2%, this being in the order of natural fluctuations of the unit.

However, if this proves necessary, there is a parameter of freedom which consists in increasing the duration of the intermediate step tj beyond its minimum duration tjm, which amounts to modifying Drm. It is thus possible to cover the entire range of reduced operations.

For example, when Dr=98%, if a ratio equal to 3 is desired in order to obtain precisely X=3, it is necessary for Drm to be equal to 94% and therefore for tjm to be set at 1.9 seconds.

There will thus be a succession of cycles with, as production, 100%, 100%, 94%, 100%, 100%, 94%, etc., this corresponding on average to 98%.

It will be noted that when there is a large buffer volume downstream of the PSA in order to average flow rate fluctuations, it may be preferable to minimize the passages from the nominal cycle to the reduced cycle while maintaining the ratio between the number of each of the 2 cycles. The above example could then result for example in the sequence:

100, 100, 100, 100, 100, 100, 94, 94, 94, 100, 100, etc.

More generally, the control device of the unit will then run the PSA following a succession of M nominal cycles and N reduced cycles, resulting on average in the required flow rate.

The problem of implementing reduced operations on a PSA unit is all the more critical when the phase times are short. For the one part, the annual number of openings/closures of valves, necessary in a conventional solution, is inversely proportional to the duration of a phase and the same goes for the duration between two programmed maintenance operations. Adding valve operations only exacerbates this point. For the other part, the possibility of triggering a reduced operation is only possible when the required flow rate is substantially lower than the nominal flow rate. The invention will therefore be particularly well suited to PSA cycles with phase times of 5 to 40 seconds.

The presence of machines and in particular vacuum pumps normally introduces additional constraints on the step durations to which the invention can provide a solution. Specifically, for machines that do not have a speed variator, extending the steps in which they are in use is the opposite of a reduced operation. Specifically, it is not desired to introduce more gas during the production step or to take the regeneration of the adsorbent further by extracting more residual gas. It is thus necessary to create dead times on the adsorber side while operating the machines in recycling mode or with air venting for example.

The invention applies particularly well to VSAs or O2 VPSAs in which the cycle comprises both short phase times, for example from 15 to 35 seconds, and equipment such as: air compressor or vacuum pump.

The method according to the invention may be entirely automated. The nominal flow rate, which, it may be recalled, can vary over time depending for example on the state of the adsorbent, may be entered manually into the system after a test for example, or be determined by the system itself depending on the actual performance at a given time and the corresponding operating conditions. A correlation for example including the main parameters (production flow rate, purity, temperature, phase time, etc.) will make it possible to find the flow rate that it will be possible to produce under nominal conditions.

The knowledge of the required production flow rate is obviously important in the context of the invention. This flow rate can be determined in different ways, be this a setpoint from the downstream unit, a direct measurement (flow meter for example) or an indirect measurement (via pressures for example).

The purity of the production is obviously an essential characteristic for the majority of the units. The analysis of the purity of the product can be introduced into the process of the invention in several manners. The simplest way consists in introducing a safety feature. It is known that, for the majority of PSA processes, reducing the production flow rate without modifying the cycle results in greater purity being produced than necessary, to the detriment of the yield and/or the specific energy, i.e. ultimately of the raw material consumption (feed gas or energy consumption). In order to avoid any risk of dropping below the purity required by triggering reduced operation, the system will only pass into an operational mode (extension of the phase times with at least one new step) in the event of excess purity.

For example, for an O2 VSA that needs to supply gas containing 90% oxygen, the reduced operation will only be brought about if the oxygen purity exceeds 9(15%.

The purity of the production may also be introduced as one of the parameters that makes it possible to determine the adequate duration of the phases or the factor X (it will be recalled that 1/X corresponds to the reduced cycle fraction when the required flow rate is between the predetermined reduced flow rate and the nominal flow rate). Returning to the example of an O2 VSA, simulations or tests on site can be used to find out the function production flow rate=g (production purity), the production flow rate being able to be standardized.

Thus, for a unit that needs to produce 90% oxygen, there could be the following pairings (standardized flow rate, purity): (100, 90%), (97, 91.5%), (92, 93%), (87, 93.5%), (82, 94%).

If the unit is operating at the required flow rate with a purity of 92%, around 4.7% of additional flow rate could be produced for a purity of 90%. Since there is no desire to increase the flow rate, the phase time may be extended in proportion, i.e., for a nominal duration of 30 seconds, change to 31.4 seconds. In this way, the required flow rate will be produced with the required purity. The same energy as before will be consumed per cycle, but by carrying out fewer cycles per hour, the energy consumption of the unit will decrease.

What is claimed is:

1. A method for regulating a unit for separating a gas stream, having P adsorbers, where P≥2, each following a PSA-type adsorption cycle with a phase time shift, the unit having a control device allowing the unit to provide a required flow rate and to operate selectively according to a nominal cycle or according to a reduced cycle, the nominal cycle involving, successively, at least a first step and a second step, the reduced cycle following the same succession of steps as the nominal cycle, with insertion of an intermediate step between the first step and the second step, the intermediate step being different from a dead time and being different from an extension of the first step or an extension of the second step, the method comprising:

operating the unit according to the nominal cycle when the required flow rate is equal to a nominal flow rate or when the required flow rate is higher than the nominal flow rate, operating the unit according to the reduced cycle when the required flow rate is lower than or equal to a predetermined flow rate, the predetermined flow rate being lower than the nominal flow rate.

2. The method according to claim 1, wherein the predetermined flow rate is defined by the relationship $Drm = Dn \times (Tphn/(Tphn+tjm))$, Drm being the predetermined flow rate, Dn being the nominal flow rate, Tphn being the phase time of the nominal cycle for the nominal production flow rate, and tjm the minimum duration of the intermediate step.

3. The method according to claim 1, comprising:
operating the unit periodically, according to the nominal cycle and according to the reduced cycle, when the required flow rate is between the predetermined flow rate and the nominal flow rate,
or operating the unit according to the nominal cycle while producing a flow rate lower than the nominal flow rate, when the required flow rate is between the predetermined flow rate and the nominal flow rate.

4. The method according to claim 1, wherein the intermediate step and the first step each involve co-current depressurization or counter-current depressurization.

5. The method according to claim 1, the intermediate step and the second step each involve co-current depressurization or counter-current depressurization.

6. The method according to claim 1, wherein the intermediate step, the first step and the second step each involve co-current depressurization or each involve counter-current depressurization.

7. The method according to claim 1, wherein the intermediate step and the first step are steps either of elution or of repressurization, each involving a counter-current intake of gas.

8. The method according to claim 1, wherein the intermediate step and the second step are steps either of elution or of repressurization, each involving a counter-current intake of gas.

9. The method according to claim 1, wherein the intermediate step, the first step and the second step are steps either of elution or of repressurization, each involving a counter-current intake of gas.

10. A unit for separating a gas stream, having P adsorbers, where $P \geq 2$, each following a PSA-type adsorption cycle with a phase time shift, the unit having a control device allowing the unit to provide a required flow rate and to operate selectively according to a nominal cycle or according to a reduced cycle, the control device being designed to implement the method according to claim 1.

\* \* \* \* \*